(12) United States Patent
Pichon et al.

(10) Patent No.: US 8,738,344 B2
(45) Date of Patent: May 27, 2014

(54) SIMULATION OF VESSELS IN AN IMAGE

(75) Inventors: Eric Pichon, Versailles (FR); Michel F. Grimaud, Montrouge (FR); Yves Lucien Trousset, Palaiseau (FR)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 13/237,535

(22) Filed: Sep. 20, 2011

(65) Prior Publication Data

US 2012/0008840 A1 Jan. 12, 2012

(51) Int. Cl.
*A61B 5/02* (2006.01)

(52) U.S. Cl.
USPC .............................. 703/11; 382/128; 382/131

(58) Field of Classification Search
None
See application file for complete search history.

(56) References Cited

U.S. PATENT DOCUMENTS

| | | | | |
|---|---|---|---|---|
| 7,739,090 | B2 * | 6/2010 | Charbel et al. | 703/11 |
| 7,848,554 | B2 * | 12/2010 | Zhao et al. | 382/128 |
| 2007/0031019 | A1 * | 2/2007 | Lesage et al. | 382/131 |
| 2007/0112264 | A1 * | 5/2007 | Wu et al. | 600/410 |
| 2008/0125640 | A1 | 5/2008 | Pichon et al. | |

OTHER PUBLICATIONS

French Search Report dated Apr. 26, 2011 which was issued in connection with the French Patent Application No. 1057559 which was filed on Sep. 21, 2010.

Eric Pichon, Gyorgy Bekes, Frederic Deschamps and Stephen B. Solomon: "Development and preliminary evaluation of software for planning selective liver embolizations from three-dimensional rotational fluoroscopy imaging". International Journal of Computer Assisted Radiology and Surgery, Nov. 1, 2008.

Rashindra Manniesing and Wiro Niessen: "Local Speed Functions in Level Set Based Vessel Segmentation" Medical Image Computing and Computer-Assisted Intervention, Sep. 26, 2004.

Rashindra Manniesing et al.: "Level set based cerebral vasculature segmentation and diameter quantification in CT angiography" Medical Image Analysis, Oxford University Press, Oxford, GB, Apr. 1, 2006.

Xunlei Wu et al.: "Real-Time Modeling of Vascular Flow for Angiography Simulation", Medical Image Computing and Computer-Assisted Intervention â Miccai 2007; [Lecture Notes in Computer Science], Springer Berlin Heidelberg, Berlin, Heidelberg, Oct. 29, 2007.

\* cited by examiner

*Primary Examiner* — Chan Park
*Assistant Examiner* — Ha Le
(74) *Attorney, Agent, or Firm* — Global Patent Operation; Marc A. Vivenzio

(57) ABSTRACT

A method for processing an image of a body region is provided, the region comprising a plurality of vessels capable of propagating a fluid of the body, the image comprising a plurality of pixels each being associated with an intensity. The method comprising determining, for each pixel, a probability that the pixel belongs to a vessel, based on the intensity of the pixel; simulating a propagation of the fluid from at least one source pixel towards the pixels of the image, the propagation being simulated to have a velocity that is function of the probability that the pixels of the image belong to a vessel; and inferring from the simulation a propagation time between the source pixel and each of the pixels of the image.

14 Claims, 2 Drawing Sheets

SIMULATION OF VESSELS IN AN IMAGE

BACKGROUND OF THE INVENTION

1. Field of the Invention

The field of the invention relates to a method for processing an image of a region of a human or animal body and device for implementing said method.

2. Description of the Prior Art

In the field of medical imaging, images of regions in a human or animal body are frequently taken to prepare subsequent medicinal treatment or surgical operations. The observed regions are most often vascularized with blood acting as carrier fluid from one organ or region to another by propagating through body vessels. In some cases, a practitioner wishes to direct a medicinal product towards a target in the region, for example, in order to eradicate a localized tumour. Alternatively, it is sometimes necessary to cut off the supply of blood to some diseased targets of the region in order to remove them.

X-ray imaging is conventionally used to take images of regions in the human body. However, X-rays primarily allow the viewing of hard structures in the body e.g. bones. To obtain an image of vessels of the body such as blood vessels (veins, arteries, etc.), it is necessary to inject a product opaque to X-rays such as iodine. Thus, the image obtained gives a certain visualization of the vessels and their mapping for the practitioner. However, because of the small diameter of some vessels (e.g. capillaries) and the limited resolution of imaging techniques, some vessels are not visible in the image. Therefore, the region to be treated may be separated from the portal chosen by the practitioner by multiple vessels not shown in the image.

Because of the above mentioned issues, the practitioner cannot plan surgical treatment or the injection of medicinal products with accuracy. In addition, the images do not produce reliable, precise visualization of vessel mapping in the observed region. Furthermore, the obtained images are static, which does not produce information regarding the propagation of blood in the region. Yet, propagation dynamics are crucial, notably in applications involving the injection of therapeutic substances.

Accordingly, it would be desirable to provide a method and a device that can improve knowledge of vessel mapping and of propagation dynamics in the observed region.

BRIEF SUMMARY OF THE INVENTION

According to an embodiment of the present invention, a method for processing an image of a body region is provided, the region comprising a plurality of vessels capable of propagating a fluid of the body, the image comprising a plurality of pixels each being associated with an intensity. The method comprising determining, for each pixel, a probability that the pixel belongs to a vessel, based on the intensity of the pixel; simulating a propagation of the fluid from at least one source pixel towards the pixels of the image, the propagation being simulated to have a velocity that is function of the probability that the pixels of the image belong to a vessel; and inferring from the simulation a propagation time between the source pixel and each of the pixels of the image.

According to another embodiment of the present invention, there is provided a processing unit configured to process an image of a body region, the region comprising a plurality of vessels capable of propagating a fluid of the body, the image comprising a plurality of pixels each being associated with an intensity. The processing unit is configured to: determine, for each pixel, a probability that the pixel belongs to a vessel, based on the intensity of the pixel; simulate a propagation of the fluid from at least one source pixel towards the pixels of the image, the propagation being simulated to have a velocity that is function of the probability that the pixels of the image belong to a vessel; and infer from the simulation, a propagation time, between the source pixel and each of the pixels of the image.

According to another embodiment of the present invention, a medical imaging device is provided. The medical imaging device comprises the processing unit, the processing unit configured to process an image of a body region, the region comprising a plurality of vessels capable of propagating a fluid of the body, the image comprising a plurality of pixels each being associated with an intensity. The processing unit is further configured to: determine, for each pixel, a probability that the pixel belongs to a vessel, based on the intensity of the pixel; simulate a propagation of the fluid from at least one source pixel towards the pixels of the image, the propagation being simulated to have a velocity that is a function of the probability that the pixels of the image belong to a vessel; and infer from the simulation, a propagation time, between the source pixel and each of the pixels of the image.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

Figure 1:
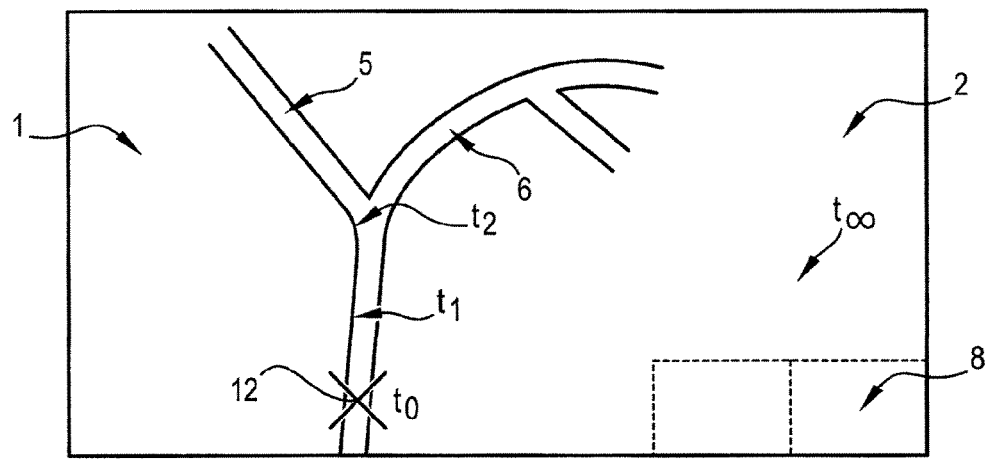
FIG. 1 is a schematic illustration of an image of a body region comprising vessels.

FIG. 1 schematically illustrates an image 1 of a region 2 in a body, for example a human or animal body. The image can be obtained with a medical imaging device, such as X-ray radiography equipment or other (tomography, MRI device, etc.). The region to be observed depends on the application. In particular, it may be a particular organ (liver, heart, etc.) or a region of interest (muscle, region in the vicinity of the spine, etc.). In general, the obtained image is an image in three dimensions. However, embodiments of the invention also apply to two-dimensional images.

As can be seen FIG. 1, the region 2 to be observed comprises a plurality of vessels 5 shown in image 1, capable of propagating a fluid 6 of said body.

In the present description, the term vessel is to be construed in its broad meaning. In a non-limiting manner, it is noted that the term vessel may concern blood vessels propagating blood to irrigate an observed region. Also, that the term vessel may concern channels conveying urine filtered by the kidneys, or channels conveying air in the lungs. A person skilled in the art will appreciate that embodiments of the invention apply to other types of vessels and fluids propagating therein.

Image 1 shows a plurality of pixels 8, each being associated with an intensity I. The intensity I represents the color of the pixel. In general, a value lies between 0 and 255 that encodes the color of the pixel in black and white.

For a three-dimensional image, the image has a plurality of voxels 8 also having an intensity I. In this case, the imaging device will average the signal measured in the volume of the voxel 8 to obtain an intensity I.

In the remainder hereof, voxels and pixels will indifferently be designated as "pixels".

Figure 2:
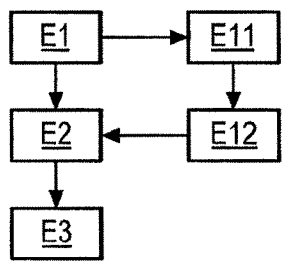
FIG. 2 is a schematic diagram of an exemplary method according an embodiment of the present invention.

In one embodiment of the invention, the image 1 is processed using a method schematically illustrated in FIG. 2. Different steps of the method can be implemented by a processing unit described below. The method comprises a first step E1 to determine a probability V for each pixel 8 that it will belong to a vessel 5, based on the intensity I of said pixel 8. The intensity I of the pixels is representative of the type of tissue visualized in the image. Greater intensity of the pixel 8 represents denser tissue encountered. Therefore, it is possible to infer a probability V, from the measured intensity, that the pixel 8 effectively represents part of a vessel 5 in the observed region.

Figure 3:
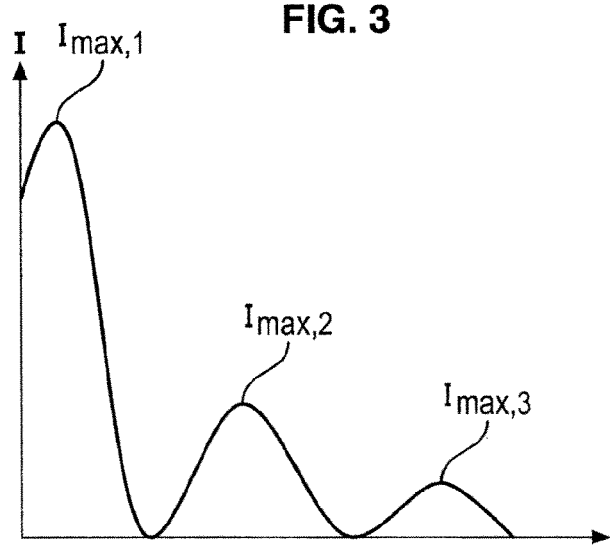
FIG. 3 is an intensity curve of pixels in an image.

In one embodiment of the invention, a curve of histogram type is used showing the intensities of the pixels in the image, as seen in FIG. 3. In this instance, the method comprises a step E11 to detect maxima in the intensity curve of the pixels in the image 1, in order to determine intensities representative of pixels belonging to a vessel 5. The intensity values may effectively vary from one imaging device to another. A highest maximum intensity $I_{max,1}$ corresponds to soft tissues which are very dense. A maximum intensity $I_{max,2}$ corresponds to the parenchyma i.e. the functional tissues of the observed organ. A maximum intensity $I_{max,3}$ corresponds to the vessels and bones. Bones and vessels effectively exhibit fairly close intensity in an image.

Knowing the intensities corresponding to the vessels, here $I_{max,3}$ and the values close to $I_{max,3}$, the method comprises a step E12 to infer a set of intensity thresholds, each threshold being associated with a probability value V of belonging to a vessel 5. The criterion for choice of intensity thresholds is based on variance around $I_{max,3}$.

Therefore, the method comprises a step to determine for each pixel of the image a probability value, between 0 and 1 (or a multiple as per write routine), characterizing the probability that a pixel will belong to a vessel in the region. It is clear from the image shown in FIG. 1 that the pixels of the visible vessels with have a high probability V. However, the pixels having lower intensity nevertheless carry a probability of belonging to a vessel which is not fully visible in the image or is even invisible for the reasons explained above. Therefore, these pixels will carry a certain probability V, although lower than that of the pixels of the vessels that are clearly visible in the image.

With step E1, it is possible to obtain an estimation of the position of the vessels 5 in the image 1. For a practitioner, this means moving on from binary values (the visualization of the raw image only allowing inference of the presence or absence of vessels) to graduated probability values which are hence more accurate.

The method comprises a second step E2 to simulate propagation of the fluid 6 from at least one source pixel 12 towards the pixels of the image 1. The source pixel 12 is a point in the image chosen by a user for example. The propagation of a fluid in the image is simulated starting from a source pixel 12. This can be done by injecting a virtual fluid at an initial zero time $t_0$ in the source pixel, and observing the propagation of this fluid towards the adjacent pixels. There may be several source pixels representing a source point comprising several pixels of the image, or several source pixels representing several different source points in the image. This simulation step takes into account the probabilities V determined at previous step E1. Therefore propagation is simulated to exhibit a velocity that is a function of the probability V that said pixels belong to a vessel 5.

In physical reality, the fluid propagates through the vessels. This property is simulated by authorizing a high velocity for those pixels encountered by the fluid having a strong probability of belonging to a vessel, and by imposing slow even zero velocity on those pixels encountered by the fluid having low probability of belonging to a vessel. In practice, the processing unit 10 performs conventional equations for fluid mechanics (Navier-Stokes, Euler . . . ) known to a person skilled in the art, to which a constraint is added for the velocity at which the fluid may pass through each pixel in the image. It is therefore a constrained numerical resolution of differential equations.

The simulated fluid circulating on a pathway comprising pixels with high probability V of belonging to a vessel will be allowed to propagate rapidly. Conversely, the simulated fluid circulating on a pathway comprising pixels with low probability V of belonging to a vessel will be constrained to show propagation or even no propagation at all.

The method further comprises a step of inferring a propagation time, from this simulation, between the source pixel 12 and each of the pixels in the image ($t_1, t_2, \ldots$). The processing unit therefore associates a propagation time with each pixel of the image. In this manner, a processed image is obtained in which each pixel is associated with a propagation time. The processing unit may be controlled so that this simulation and this determination of propagation time are only performed for some pixels in the image, for example on order given by a user or as programmed Some pixels in the image are only reached after a very long, even infinite, time $t_\infty$ since these pixels are located on pathways having few or no vessels.

Advantageously, step E3 comprises the inferring, from the simulation, of a mean propagation time between the source pixel 12 and each of said pixels. This value is in fact the distance between the source pixel and the pixel under consideration divided by the propagation time inferred from the simulation.

One advantage of having a propagation velocity for each pixel is that it obtains values which are independent of the distance between the source pixel and the pixels under consideration. By considering the propagation time, it is obvious that some distant pixels, although located on a pathway comprising one or more vessels, will have a similar propagation time to a pixel which is not located on a vessel but which is located in the vicinity of the source pixel.

Advantageously, the processing method comprises steps allowing the accuracy of results to be improved.

In one embodiment, the propagation of the fluid 6 towards some pixels of the image 1 is prohibited during the simulation step E2, said pixels initially being known as not belonging to a vessel 5.

It is frequent to have prior knowledge of the observed region, such as anatomical knowledge or knowledge based on other imaging.

In this case, it is known that some pixels do not represent vessels but bones for example or other structures. The simulation step then takes this additional knowledge into account by prohibiting propagation of the fluid towards these pixels. This is generally achieved by imposing zero velocity upon the fluid when it encounters these pixels.

In one embodiment, the steps E1, E2, E3 are repeated to fine-tune results. As described above, a step is conducted to determine a probability V for each pixel 8 that it belongs to a vessel 5, based on the intensity of said pixel 8. Next, a step is conducted to simulate propagation of the fluid from at least one source pixel 12 towards the pixels of the image 1, said propagation being constrained to have a velocity that is a function of the probability V that said pixels belong to a vessel 5. A step is also performed to infer from the simulation a propagation time and/or a propagation velocity between the source pixel 12 and each of said pixels. Next, another determination step is performed to determine a probability V' that the pixels of the image belong to a vessel 5, but this time by ignoring those pixels having a propagation time greater than a threshold and/or a propagation velocity lower than a threshold.

These pixels effectively represent structures different from vessels, such as bones, since they lie distant from the vessels. At repeated step E1, these pixels are no longer taken into consideration in the intensity curve of the pixels of the image, as was the case in FIG. 3, which allows fine-tuned intensity thresholds to be obtained and hence a fine-tuned set of probabilities V' of belonging to a vessel 5.

The simulation E2 and inference E3 steps of propagation time and/or propagation velocity are then repeated using the fine-tuned set of probabilities V', which allows more accurate results to be obtained.

Advantageously, the method comprises a step to display an image containing a certain amount of data for an operator, notably a practitioner.

In one embodiment, an image is displayed, said image illustrating the propagation time and/or propagation velocity of a set of pixels in the image. This is achieved via a colour code for example or other means.

In another embodiment, an image of the vessels in region 2 is displayed, corresponding to the pixels 8 whose propagation time is lower than a threshold and/or whose propagation velocity is higher than a threshold. The image is therefore a more accurate image of the vessels revealing capillaries which were not visible initially with the imaging technique. The characteristic thresholds of the vessels are defined empirically or by simulating equations of fluid propagation in the vessels. The pixels having a high propagation velocity most probably represent a vessel, whilst the pixels having a low propagation velocity probably represent other structures such as bones. The same type of reasoning can be applied to propagation time. The user is then provided with mapping of the vessels in the image.

Figure 4:
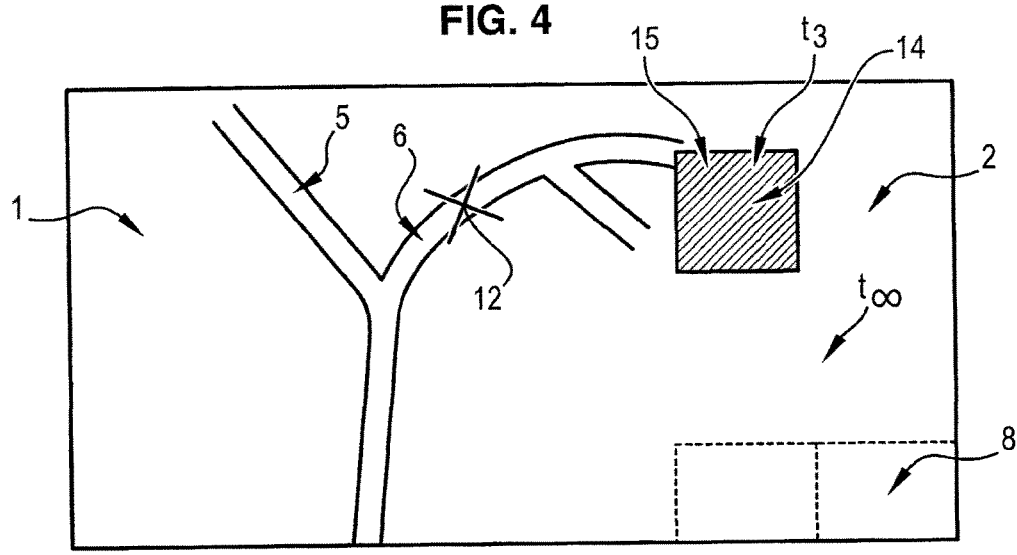
FIG. 4 is an illustration of pixels reached by a product injected at the point of at least one source pixel of the image.

The methods of the disclosure can be given numerous applications. In one embodiment, a user desires to predict the propagation of a product injected at a source point 12 of a vessel in the image. The product is a medicinal product for example intended to eliminate cancerous cells in a region of the organ. From the simulation E2 performed by the processing unit, this unit is able to determine and to display those pixels 14 which will be reached by the product injected at a source pixel 12. Therefore, as schematized in FIG. 4, the processing unit determines that the product injected at the source pixel 12 will reach the region 15 after a time $t_3$. A propagation map of the product in the vessels of the image starting from the source pixel can therefore be displayed.

Figure 5:
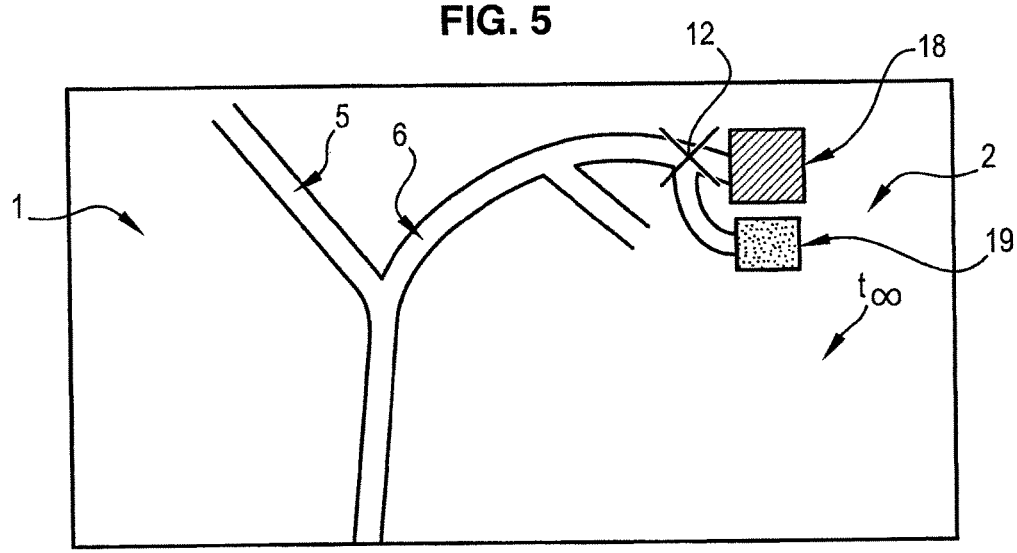
FIG. 5 is an illustration of a pixel source which allows reaching of a target in the image.

Alternatively, a user may wish to reach a given target in a region of the image, with a product for example, or for the purpose of cutting off the supply of blood fluid to a diseased target. In this case, the user defines the target 18 of pixels to be reached in the image 1. This defining may be automatic, the user solely indicating the name or position of the region. The method then comprises a determination step, by means of the simulation performed at step E2, to determine at least one source pixel 12 in the image linked to the target 18 via vessels 5, as shown in FIG. 5. It is in fact a reverse problem in which the processing unit knows the arrival pixel and infers the source pixel via the simulation (step E2) of the propagation of the fluid in the vessels. Therefore, the operator knows that a product must be injected at the source pixel 12 to reach the target 18. The source pixel 12 and the corresponding pathway allowing the target 18 to be reached are determined, this determination able to be used in particular by a user to guide a probe of catheter type.

It is possible that propagation from a source pixel 12, such as determined by the processing unit, leads to propagation towards non-intended targets such as target 19 in FIG. 5. In this case, the pixels linked to the source pixel 12 via vessels, but not belonging to the initially defined target 18, are also determined.

Advantageously, the method comprises a step to provide quantitative data on the non intended target. These may relate to its volume, ratio between the targeted target and non intended target (volume, weight, percentage ratio, etc.) the level of collateral damage, etc.

Figure 6:
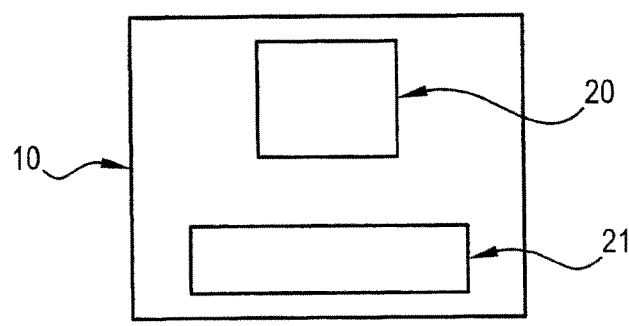
FIG. 6 is an illustration of a processing unit capable of implementing different embodiments of the method according to the invention.

Embodiments of the invention also concern the processing unit (cf. FIG. 6) capable of implementing the different embodiments of the method described in the foregoing. In general, the processing unit 10 is a computer, which receives instructions from a computer program loaded in the memory of said computer, said program comprising instructions for the previously described method. The processing unit 10 typically comprises display means 20 of monitor type, and interaction means 21 with a user (keyboard, mouse, touch surface, etc.) The display means 20 allow the display of the processed image comprising the data mentioned previously and notably the propagation times, propagation velocities, vessel mapping, etc.

The processing unit can be integrated in a medical imaging device of scanner, such as MRI or other type. In particular, it may be a processing unit of the medical imaging device which has a memory in which the abovementioned computer program can be loaded.

In one advantageous embodiment, a user e.g. a practitioner can interact with the processing unit to select and fine-tune desired data. Therefore, on the monitor of the processing unit, the user may select the source pixels 12 and/or the targeted pixels to be reached in the image. If the user has selected a target 18 of pixels, the processing unit displays the source pixel(s) of the image linked to the target 18 via vessels 5. The processing unit also displays the pathway allowing the source pixels to be linked to the target. In one embodiment, the user can fine-tune the source pixels and the chosen pathway by selecting those desired pixels to maintain or to eliminate, for example on a basis of knowledge of the patient's anatomy. The interaction between the user and the processing unit provides improved results.

Embodiments of the invention have the advantage of being simple to use and apply, which therefore avoids overloading the processing capacities of the processing unit.

In addition, embodiments of the invention are very versatile, insofar as they can be applied to numerous types of image, imaging devices and observed body regions. Most living bodies (human, animal, plant, etc.) have regions comprising vessels capable of carrying a fluid whose mapping and propagation dynamics it is desired to determine.

Finally, even with future improvement in the resolution of imaging devices, some vessels will still remain invisible to a user in the image taken by said devices. Embodiments of the invention will therefore maintain usefulness for the simulation of these non-visible vessels.

Embodiments of the invention can be given numerous applications, notably medical, amongst which interventional radiology, embolisation and chemoembolisation.

What is claimed is:

1. A method for processing an image of a body region, the region comprising a plurality of vessels capable of propagating a fluid of the body, the image comprising a plurality of pixels each being associated with an intensity, the method comprising:
   determining, for each pixel, a probability that the pixel belongs to a vessel, based on the intensity of the pixel;
   simulating a propagation of the fluid from at least one source pixel towards the pixels of the image, the propagation being simulated to have a velocity that is function of the probability that the pixels of the image belong to a vessel; and
   inferring from the simulation a propagation time between the source pixel and each of the pixels of the image.

2. The method according to claim 1, wherein inferring a propagation time between the source pixel and each of the pixels of the image further comprises inferring a mean propagation velocity between the source pixel and each of the pixels of the image.

3. The method according to claim 1, wherein simulating a propagation of the fluid further comprises prohibiting the propagation of the fluid towards some pixels of the image, the pixels being initially known as not belonging to a vessel.

4. The method according to claim 1, wherein determining a probability that the pixel belongs to a vessel, based on the intensity of the pixel further comprises:
   detecting a maxima in an intensity curve of the pixels in the image to determine intensities representing pixels belonging to a vessel, and
   inferring a set of intensity thresholds, each threshold being associated with a probability value of belonging to a vessel.

5. The method according to claim 1, further comprising:
   determining, for pixels of the image, a fine-tuned set of probabilities of belonging to a vessel by ignoring pixels having a propagation time higher than a threshold and/or a propagation velocity lower than a threshold; and
   repeating the simulation and inference steps of the propagation time and/or propagation velocity, using the fine-tuned set of probabilities.

6. The method according to claim 1, further comprising displaying an image showing the propagation time and/or propagation velocity of a set of pixels in the image.

7. The method according to claim 1, further comprising displaying an image of the vessels in the region corresponding to pixels comprising a propagation time that is lower than a threshold and/or pixels comprising a propagation velocity that is higher than a threshold.

8. The method according to claim 1, wherein the body is a human or animal body and the fluid is blood.

9. The method according to claim 1, further comprising determining which pixels in the image towards which a product, inserted in the fluid at the source pixel, is capable of propagating via vessels.

10. The method according to claim 1, further comprising displaying a propagation map of the product in the vessels of the image.

11. The method according to claim 1, further comprising:
    defining a target of pixels to be reached in the image; and
    determining at least one source pixel in the image linked to the target via vessels.

12. The method according to claim 11, further comprising determining which pixels are linked to the source pixel but not belonging to the target.

13. A processing system configured to process an image of a body region, the region comprising a plurality of vessels capable of propagating a fluid of the body, the image comprising a plurality of pixels each being associated with an intensity, the processing system comprising:
    a memory; and
    a processor configured to determine, for each pixel, a probability that the pixel belongs to a vessel, based on the intensity of the pixel; simulate a propagation of the fluid from at least one source pixel towards the pixels of the image, the propagation being simulated to have a velocity that is function of the probability that the pixels of the image belong to a vessel; and infer from the simulation, a propagation time, between the source pixel and each of the pixels of the image.

14. A medical imaging device comprising a processing unit, the processing unit configured to process an image of a body region, the region comprising a plurality of vessels capable of propagating a fluid of the body, the image comprising a plurality of pixels each being associated with an intensity, the processing unit being further configured to: determine, for each pixel, a probability that the pixel belongs to a vessel, based on the intensity of the pixel; simulate a propagation of the fluid from at least one source pixel towards the pixels of the image, the propagation being simulated to have a velocity that is a function of the probability that the pixels of the image belong to a vessel; and infer from the simulation, a propagation time, between the source pixel and each of the pixels of the image.

* * * * *